June 3, 1969     D. S. CHISHOLM     3,448,183

METHOD FOR THE PREPARATION OF MULTILAYER FILM

Filed Aug. 5, 1966

INVENTOR.
Douglas S. Chisholm
BY
AGENT

United States Patent Office 3,448,183
Patented June 3, 1969

3,448,183
METHOD FOR THE PREPARATION OF MULTILAYER FILM
Douglas S. Chisholm, Midland, Mich., assignor to The Dow Chemical Company, Midland, Mich., a corporation of Delaware
Filed Aug. 5, 1966, Ser. No. 570,650
Int. Cl. B29c 29/00
U.S. Cl. 264—37                                      4 Claims

ABSTRACT OF THE DISCLOSURE

Multilayer or simultaneously intruded plastic sheet is tentered. The sheet is extruded in such a manner that beaded edges are provided of only one of the resinous components of the sheet. This permits recycling of the edge trim without the necessity of either discarding or attempting to separate two resinous materials.

---

This invention relates to an improved method for the preparation of oriented multilayer film, and more particularly relates to a method for the preparation of multilayer film by simultaneous extrusion and tentering.

Multilayer simultaneously extruded film and sheet is desirable for various purposes in that synthetic resinous materials of the varying physical properties may be combined to provide a composite extruded laminate having desired physical properties. Oftentimes, it is desired to prepare such laminates by means of an extrusion and tentering process, that is, a composite sheet is extruded and subsequently biaxially stretched by a suitable tentering apparatus. Oftentimes in a tentering process, it is desired to extrude a sheet having enlarged portions adjacent the edges, such enlarged portions are often referred to as beads. The beads on opposed edges of the sheets are grasped and the sheet is stretched. When a homogeneous sheet is being handled, the bead or edge portions are grasped by the tentering apparatus and the sheet stretched to an appropriate degree. The beaded edge portions usually are severed from the sheet and the film or sheet wound onto a mill roll or processed in some other desired manner. The bead is subsequently returned, often through a grinder and/or pelletizer, re-plastified and re-extruded. In the preparation of layered sheet, often considerable difficulty is encountered by the tentering process in that a bead having two different polymers therein which are often incompatible require separation of the polymers prior to re-extrusion or discarding the bead portion as scrap. Either of these approaches is undesirable and costly.

It would be beneficial if there were available an improved method for the extrusion and biaxial stretching by the tentering process of a plastic sheet having two or more synthetic resinous thermoplastic components as distinct and separate layers.

Further it would be advantageous if there were a method available for the extrusion and tentering of a layered sheet having edge beads which could be severed from a tentered sheet and returned for further processing.

It would also be advantageous if there were available a method for the preparation of tentering of layered sheet having edge beads wherein the edge beads were of a single phase.

These benefits and other advantages in accordance with the present invention are achieved in a method for the preparation of a synthetic resinous film by extrusion and tentering wherein at least two diverse synthetic resinous materials are heat plastified, formed into a desired layered configuration, extruded from an extrusion orifice in the form of a sheet having beaded edges, the sheet having two major surfaces, the diverse materials having surfaces generally parallel to the major surfaces of the sheet, the improvement which comprises extruding a composite sheet wherein the beaded edges consist of only one of the resinous materials.

Further features and advantages of the present invention and operation of the method of the present invention will become more apparent from the following specification taken in connection with the drawing wherein.

Figure 1:
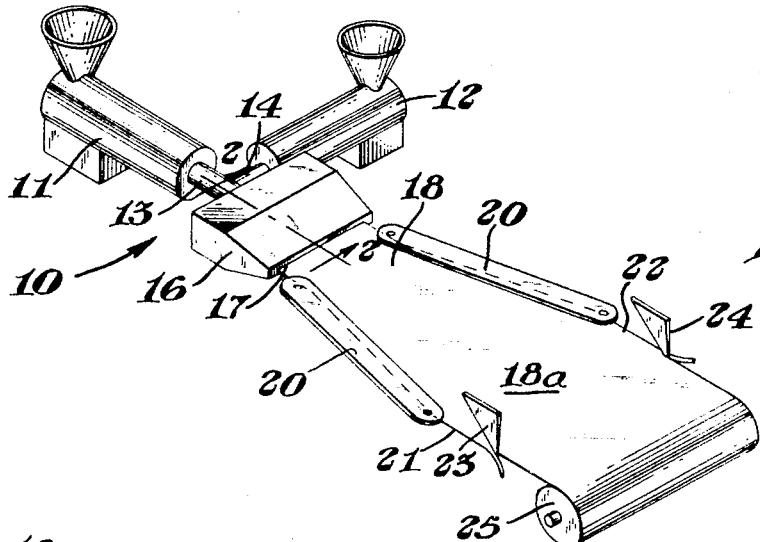
FIGURE 1 is a schematic representation of sheet formation in accordance with the invention.

In FIGURE 1 there is illustrated a schematic isometric representation of a sheet producing apparatus generally designated by the reference numeral 10. Employing the method of the invention, the sheet producing apparatus 10 comprises in cooperative combination a first extruder 11 and a second extruder 12. The first extruder 11 has a discharge conduit 13. The second extruder 12 has a discharge conduit 14. The conduit 14 passes within the conduit 13. A sheet extrusion die 16 is affixed to the conduit 13 and adapted to receive material therefrom. The die 16 has disposed therein means to discharge the extrude of the second extruder 12 in a generally linear manner. The die 16 has an extrusion orifice 17. A composite layered film 18 issues from the slot-like orifice 17. A tentering apparatus generally designated by the reference numeral 20 grasps edge portions of the film 18, biaxially stretches the film 18 to form a film 18a having a first beaded edge 21 and a second beaded edge 22. Edge trimmers such as the knives 23 and 24 sever the beads 21 and 22 from the film 18a which is wound onto the mill roll 25.

Figure 2:
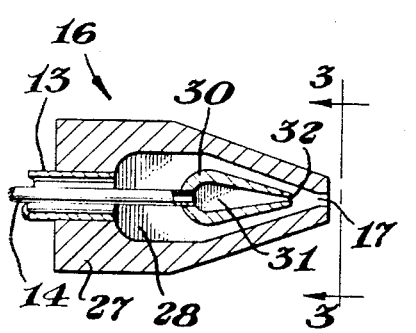
FIGURE 2 is a sectional view of the die of FIGURE 1 taken along the line 2—2 thereof.

In FIGURE 2 there is shown a sectional view of the die 16 of FIGURE 1 taken along the line 2—2. The die 16 has a body portion 27. The body portion 27 defines an internal cavity 28 and an elongate slot-like extrusion orifice 17. The conduit 13 from the first extruder 11 discharges heat plastified synthetic resinous material directly into the cavity 28. The conduit 14 from the second extruder 12 extends into the cavity 28 and is in communication with a housing or body 30. The body 30 defines a second internal cavity 31 having an elongate extrusion orifice 32. The elongate extrusion or orifice 32 is spaced adjacent and generally parallel to the extrusion orifice 17.

Figure 3:
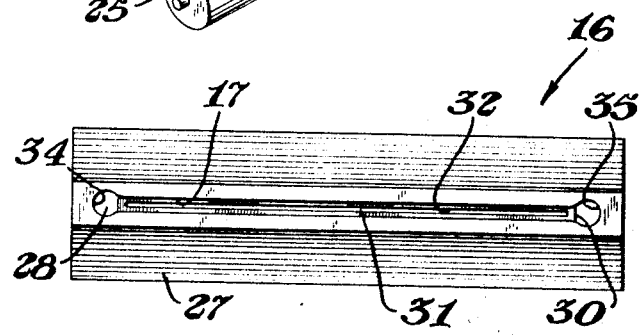
FIGURE 3 is an exaggerated view of the die of FIGURE 2 taken along the line 3—3.

In FIGURE 3 there is depicted an exaggerated shortened view of the die 16 of FIGURES 1 and 2 showing the relationship of the body 27 to the body 30 and the relationship of the slot 17 and the slot 32. The slot 17 defines an enlarged terminal portion or bulbous opening 34 and a second enlarged or bulbous portion 35. The slot 32 extends a distance substantially less than the slot 17.

Figure 4:
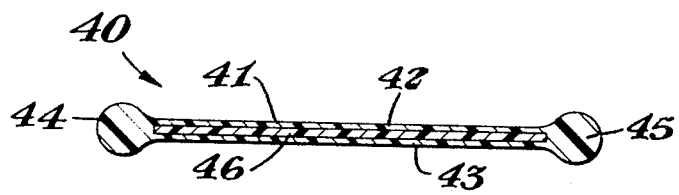
FIGURE 4 is a sectional view of a multilayer plastic film prepared in accordance with the method of the invention.

In FIGURE 4 there is depicted a cross-sectional representation of an extruded sheet generally designated by the reference numeral 40. The sheet 40 comprises a central layered portion 41 having a first surface layer 42 of a first polymer and a second surface layer 43 of a first polymer. The sheet 40 has a first bead portion 44 and a second bead portion 45 disposed at opposite edges thereof. A third polymer layer 46 is disposed within the central portion 41 and is in spaced relationship to the beads 44 and 45.

Figure 5:
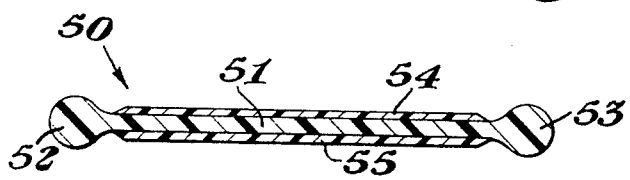
FIGURE 5 is a sectional view of an alternate plastic film prepared in accordance with the method of the invention.

In FIGURE 5 there is shown a schematic cross-sectional representation of an alternate sheet generally designated by the reference numeral 50 prepared in accordance with the method of the invention. A central layer 51 having opposed edge beads 52 and 53 lies between a first surface layer 54 and a second surface layer 55. The edge beads 52 and 53 are formed from the material of the central layer. Such a configuration is readily obtained by modifying the die opening of FIGURES 1, 2 and 3 to the configuration of the sheet. Thus the most heat stable polymer composition may be employed for the edge beads and recycled.

The method of the invention is readily practiced employing apparatus similar to that of FIGURES 1, 2 and 3. The desired synthetic resinous material is heat plastified within the extruder 11, passed to the die 16 through the conduit 13 and is extruded through the orifice 17 from the cavity 28 to form a sheet having a cross-sectional configuration such as that depicted in FIGURE 4. Synthetic resinous material from the extruder 12 passing through the conduit 14 is discharged into the cavity 31 of the housing 30 which is disposed within the cavity 28. The material is discharged from the extrusion slot 32 in a sheet-like form and parallel to the sheet issuing from the slot 17. The width of the slot 32 is less than the overall width of the slot 17. Thus, the material from the second extruder is not coextensive with the material from the first extruder. The material from the second extruder is disposed more centrally within the sheet allowing the bead portions 44 and 45 to be composed of a single resinous composition which, after serving the purpose of the grip or bead during tentering, is removed by edge trimming and returned for further processing.

By way of further illustration, employing an apparatus generally as illustrated in FIGURE 1, low density polyethylene is extruded from the first extruder. A copolymer of 85 parts vinylidene chloride and 15 parts vinyl chloride is extruded from the second extruder to provide a sheet having the general configuration as that shown in FIGURE 4. The resultant sheet is tentered, the edge trimmed and subsequently recycled to the first extruder without indication that any vinylidene chloride-vinyl chloride copolymer is present.

What is claimed is:

1. In a method for the preparation of a synthetic resinous sheet or film by extrusion and tentering wherein at least two diverse synthetic resinous materials are heat plastified, formed into a desired layered configuration, extruded from an extrusion orifice in the form of a sheet having beaded edges, the sheet having two major surfaces, the diverse materials having surfaces generally parallel to the major surfaces of the sheet, the improvement which comprises extruding a composite sheet wherein the beaded edges consist of only one of the resinous materials and thereafter removing the beaded edges from the sheet and subsequently reextruding a major portion of the severed edge material.

2. The method of claim 1 wherein one synthetic resinous material is encapsulated within the resinous material which forms the major surfaces of the sheet and the beaded edge.

3. The method of claim 3 wherein the encapsulated material extends between locations adjacent the beaded edges.

4. The method of claim 4 wherein a vinylidene chloride polymer is disposed within polyethylene.

References Cited

UNITED STATES PATENTS

| | | | |
|---|---|---|---|
| 3,072,962 | 1/1963 | McDermott et al. | |
| 3,192,293 | 6/1965 | Van Riper | 264—146 |
| 3,211,816 | 10/1965 | Brown | 264—177 |
| 3,223,761 | 12/1965 | Raley | 264—95 |
| 3,274,646 | 9/1966 | Krystof. | |

ROBERT F. WHITE, *Primary Examiner.*

JEFFERY R. THURLOW, *Assistant Examiner.*

U.S. Cl. X.R.

18—13; 264—171, 177, 210

UNITED STATES PATENT OFFICE
CERTIFICATE OF CORRECTION

Patent No. 3,448,183      Dated June 3, 1969

Inventor(s) Douglas S. Chisholm

It is certified that error appears in the above-identified patent and that said Letters Patent are hereby corrected as shown below:

Column 4, line 21, the claim reference numeral "3" should read -- 2 --; line 24, the claim reference numeral "4" should read -- 3 --.

SIGNED AND SEALED

NOV 4 1969

(SEAL)
Attest:

Edward M. Fletcher, Jr.
Attesting Officer

WILLIAM E. SCHUYLER, JR
Commissioner of Patents